(12) United States Patent  (10) Patent No.: US 8,733,101 B2
Hoshi et al.  (45) Date of Patent: May 27, 2014

(54) WASTEGATE VALVE

(75) Inventors: Toru Hoshi, Tokyo (JP); Isao Tomita, Tokyo (JP); Takao Yokoyama, Tokyo (JP); Noriyuki Hayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 161 days.

(21) Appl. No.: 13/388,006

(22) PCT Filed: Jan. 13, 2011

(86) PCT No.: PCT/JP2011/050482
§ 371 (c)(1),
(2), (4) Date: Feb. 29, 2012

(87) PCT Pub. No.: WO2011/087069
PCT Pub. Date: Jul. 21, 2011

(65) Prior Publication Data
US 2013/0199175 A1 Aug. 8, 2013

(30) Foreign Application Priority Data
Jan. 15, 2010 (JP) ................................. 2010-006685

(51) Int. Cl.
*F02D 23/00* (2006.01)
(52) U.S. Cl.
USPC ............. 60/602; 251/299; 251/300; 251/301; 251/304
(58) Field of Classification Search
USPC .................... 60/602; 251/300, 301, 299, 304
See application file for complete search history.

(56) References Cited

U.S. PATENT DOCUMENTS

| | | | | |
|---|---|---|---|---|
| 401,680 | A | * | 4/1889 | Boynton ...................... 251/299 |
| 413,941 | A | * | 10/1889 | Hawkins ...................... 251/299 |
| 5,046,317 | A | | 9/1991 | Satokawa |
| 5,052,362 | A | * | 10/1991 | Jenny et al. .................... 60/602 |
| 7,360,362 | B2 | * | 4/2008 | Nicolle et al. ................. 60/612 |

(Continued)

FOREIGN PATENT DOCUMENTS

| | | |
|---|---|---|
| CN | 101460710 A | 6/2009 |
| EP | 2 251 533 A1 | 11/2010 |
| GB | 2 038 940 A | 7/1980 |
| JP | 62-020132 U | 2/1987 |

(Continued)

OTHER PUBLICATIONS

Notice of Allowance dated Aug. 26, 2013 for corresponding Korean Application No. 10-2012-7000904 with an English translation.

*Primary Examiner* — Thomas Denion
*Assistant Examiner* — Ngoc T Nguyen
(74) *Attorney, Agent, or Firm* — Birch, Stewart, Kolasch & Birch, LLP

(57) ABSTRACT

In a wastegate valve which is provided in the bypass path bypassing the turbine of the turbocharger in the exhaust gas path and which opens and closes the bypass path, the wastegate valve is provided with a valve seat which is formed in a plane perpendicular to or tilted with an inclination angle with respect to an axial direction of the bypass path, and a valving element which is pivotable around a pivot point which has a relationship of 0°<β<90° with respect to the plane including the valve seat where β is an inclination angle, the valving element being moved away from or closer to the valve seat by pivotation of the valving element to open or close the valve.

3 Claims, 6 Drawing Sheets

(56) References Cited

U.S. PATENT DOCUMENTS

2006/0081799 A1* 4/2006 Wittmer et al. ................ 60/602
2007/0257223 A1* 11/2007 van de Moosdijk et al. . 251/300
2009/0014674 A1* 1/2009 Grissom et al. ............... 251/299
2009/0151352 A1 6/2009 McEwan et al.
2010/0187460 A1 7/2010 An et al.

FOREIGN PATENT DOCUMENTS

| JP | 2004-332686 A | 11/2004 |
| JP | 2009-092026 A | 4/2009 |
| JP | 2009-539018 A | 11/2009 |
| WO | WO 2009/107555 A1 | 9/2009 |

* cited by examiner

Related Art

US 8,733,101 B2

WASTEGATE VALVE

TECHNICAL FIELD

The present invention relates to a wastegate valve which is provided in a bypass path bypassing a turbine of a turbocharger in an exhaust gas path of an engine and which opens and closes the bypass path.

BACKGROUND ART

In a turbocharger which compresses intake air for an engine, a bypass path is provided to prevent over-rotation of the turbocharger due to increased pressure of the exhaust gas. The bypass pass bypasses the turbine from the exhaust gas inlet side of the outlet side of the turbine of the turbocharger and is opened and closed by the wastegate valve.

FIG. 9 shows a structure of a supply and exhaust device of the engine to which a wastegate valve is applied.

In FIG. 9, a supply path 58 is connected to an engine 52 via a supply manifold 56 and an exhaust path 60 is connected to the engine 52 via an exhaust manifold 54.

In the supply path 58, a compressor 70a of the turbocharger 70 is provided. The compressor 70a is coaxially arranged with and driven by a turbine 70b. On a downstream side of the compressor 70a in the supply path 58, an intercooler 62 is provided to cool the intake air flowing in the supply path 58 by heat exchange with ambient air. On a downstream side of the intercooler 62 in the supply path 58, a throttle valve 64 is provided to regulate a flow rate of the intake air flowing in the supply path 58.

In the exhaust path 60, the turbine 70b of the turbocharger 70 is provided. The turbine 70b is driven by the exhaust gas from the engine 52. In the exhaust path 60, a bypass path 2 connects an exhaust gas inlet side of the turbine 70b to an exhaust gas outlet side to bypass the turbine 70b. In the bypass path 2, a wastegate valve 4 is provided to open and close the bypass path 2.

With the above structure, once the engine 52 starts, the exhaust gas from the engine 52 is collected into an exhaust gas manifold 54 and fed to the turbine 70b of the turbocharger 70 through the air exhaust path 60 to drive the turbine 70b.

In the turbocharger 70, the compressor 70a is driven by the turbine 70b to compress the intake air. The compressed intake air is supplied through a supply manifold 56 to the engine 2 via the supply path 58, the intercooler 62 and the supply path 58.

In the case of preventing the over-rotation of the turbocharger 2, the exhaust gas from the engine 2 may be led to the bypass path to bypass the turbine 70b by opening the wastegate valve 4.

For instance, a pressure at an outlet of the compressor 70a may be detected and once the detected pressure exceeds a preset threshold value, the wastegate valve 4 may be opened to allow the exhaust gas to bypass the turbine 70b, thereby preventing the over-rotation of the turbocharger.

As a conventional wastegate valve, a swing-type valve having a valve seat in a plane perpendicular to an axial direction of the bypass path at an open end thereof. This type of the wastegate valve is disclosed in Patent Literature 1.

FIG. 11 is a side view of the conventional wastegate valve. FIG. 12 is a fragmentary side view taken in a direction of an arrow B of FIG. 11. FIG. 11 and FIG. 12 show local sectional views.

In FIG. 11 and FIG. 12, a wastegate valve 104 includes a valving element 144 and a valve seat 142 on which the valving element 144 is placed. The valving element 144 is supported by a pivot shaft 146 via a support arm 148 pivotable in a direction of an arrow W' around an axial center r' of the pivot shaft. The wastegate valve 104 is closed by placing the valving element 144 on the valve seat 142.

In FIG. 11 and FIG. 12, the valve seat 142 is arranged in the plane which is perpendicular to the axial direction of the bypass path.

To open the valving element 144, the pivot shaft 146 is turned so that the valving element 144 is moved away from the valve seat 142 in the direction of the arrow W' to a valve-open position.

CITATION LIST

Patent Literature

[PTL 1]
JP 2009-92026A

SUMMARY OF INVENTION

Technical Problem

Previously, the wastegate valve was controlled to fully open when a parameter related to the over-rotation of the turbocharger such as an outlet pressure of the compressor exceeds a preset threshold, and to be fully closed otherwise.

In recent years, it is desired to use the wastegate valve positively for controlling the turbocharger and it is preferable to be able to regulate the flow rate of the exhaust gas passing through the bypass path of the turbine by half-opening the wastegate valve in addition to full-opening and shut-down thereof.

FIG. 10 is a graph showing a relationship between an opening degree of the wastegate valve and the flow rate through the valve/the flow rate in a full-open state [%] regarding the conventional wastegate valve shown in FIG. 11 and FIG. 12. Herein, "the flow rate in a full-open state" is a flow rate of the exhaust gas passing through the bypass path when the wastegate valve is fully open, whereas "the flow rate through the valve" is a flow rate of the exhaust gas passing through the bypass path at each opening degree of the wastegate valve.

As shown in FIG. 10, in the conventional wastegate valve having the valve seat arranged in the plane perpendicular to the axial direction of the bypass path, the slope of the line is not constant. Particularly with small opening degree, the slope is sharp, i.e. the flow rate of the exhaust gas passing through the bypass path changes drastically with a slight change in the opening degree of the wastegate valve. Therefore, it was difficult to control the flow rate of the exhaust gas with use of the conventional wastegate valve and this is very evident in the region where the valve opening is small.

When there is clearance for or looseness due to assembling of the wastegate valve, in the region where the valve opening is small, a flow change of the exhaust gas causes the opening degree of the valve to change for the amount corresponding to the clearance or looseness and thus, leading to a drastic change in the flow rate of the exhaust gas.

As described above, in the conventional wastegate valve having the valve seat arranged in the plane perpendicular to the axial direction of the bypass path, it remains difficult to control the flow rate of the exhaust gas passing through the bypass path by regulating the opening degree of the wastegate valve.

In recent years, application of an actuator equipped with a stroke sensor is making progress and precise control of a supercharging pressure from the engine side is desired. As a method for performing more precise control, there is a VG Nozzle. However, the VG Nozzle is expensive and has a complicated structure and thus, the VG nozzle is not reliable enough to be used for a gasoline engine at high temperature.

In view of the above issues, it is an object of the present invention is to provide a wastegate valve which is provided in the bypass path bypassing the turbine of the turbocharger in the exhaust gas path to open and close the bypass path and which can control the flow rate of the exhaust gas passing through the bypass path easily and stably by controlling the opening degree thereof.

Solution to Problem

To solve the above issues, the present invention provides a waste gate valve which is provided in a bypass path bypassing a turbine of a turbocharger in an exhaust gas path of an engine and which opens and closes the bypass path, the valve including, but not limited to:

a valve seat which is formed in a plane perpendicular to or tilted with an inclination angle with respect to an axial direction of the bypass path; and a valving element which is pivotable around a pivot point which has a relationship of $0°<\beta<90°$ with respect to the plane including the valve seat where $\beta$ is an inclination angle, the valving element being moved away from or closer to the valve seat by pivotation of the valving element to open or close the valve.

By this, a resolving power of the stroke of the wastegate valve becomes precise. Therefore, the flow rate of the exhaust gas passing through the wastegate valve changes slowly in response to opening of the valve. This is more evident in the region where the opening degree of wastegate valve is small.

Therefore, it becomes easy to control the flow rate of the exhaust gas passing through the bypass path by regulating the opening degree of the wastegate valve in all regions including the region where the opening degree of the valve is small.

Further, the valving element may be supported by a pivot shaft such that the valving element is pivotable around a shaft center of the pivot shaft, the pivot shaft having the inclination angle of $\beta$ with respect to the plane including the valve seat.

By this, it becomes easy to allow the valving element to pivot around the pivot center in the direction perpendicular to the flow of the exhaust gas.

Furthermore, the valve seat may have an inclination angle $\alpha$ of 45° to 80° with respect to the plane which is perpendicular to the axial direction of the bypass path.

At the inclination angle $\alpha$ greater than 80°, it is difficult to achieve enough sealing when the wastegate valve is closed and the exhaust gas possibly leaks through the wastegate valve even in the closed state of the wastegate valve.

At the inclination angle $\alpha$ below 45°, the effectiveness of stable control of the flow rate of the exhaust gas is small.

Furthermore, the valve seat may have an inclination angle $\alpha$ of 60° to 70° with respect to the plane perpendicular to the axial direction of the bypass path.

At the inclination angle $\alpha$ not greater than 70°, it is possible to attain high sealing capability. And at the inclination angle $\alpha$ not less than 60°, it is possible to control the flow rate of the exhaust gas passing through the wastegate valve in a more stable manner.

Advantageous Effects of Invention

The wastegate valve provided in the bypass path bypassing the turbine of the turbocharger in the exhaust gas path to open and close the bypass path is now capable of controlling the flow rate of the exhaust gas passing through the bypass path easily and stably by controlling the opening degree thereof.

DESCRIPTION OF EMBODIMENTS

An embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Embodiment

Figure 9:
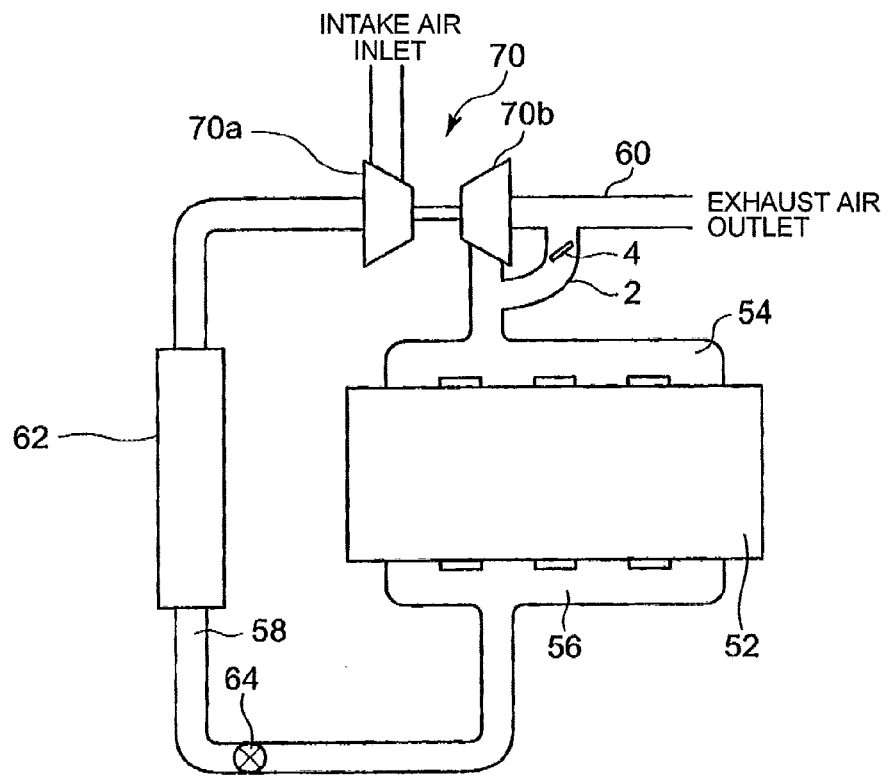
FIG. 9 shows a structure of a supply and exhaust device of the engine to which the wastegate valve is applied.
Figure 10:
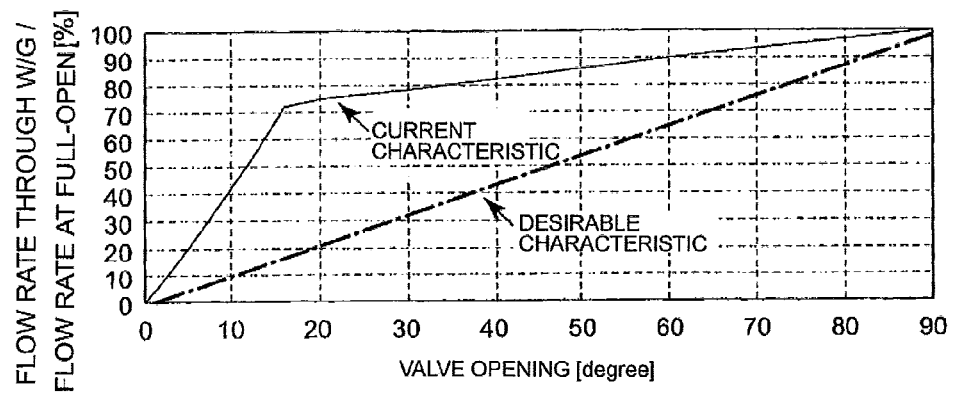
FIG. 10 is a graph showing a relationship between an opening degree and a flow rate through a valve/a flow rate in a full-open state [%] regarding a conventional wastegate valve.
Figure 11:
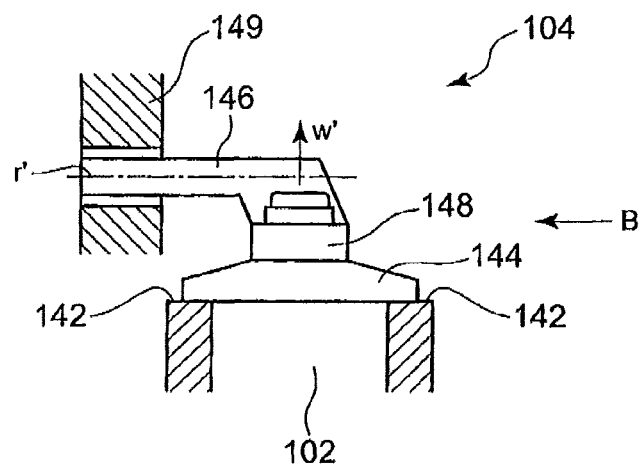
FIG. 11 is a side view of the conventional wastegate valve with a local sectional view.
Figure 12:
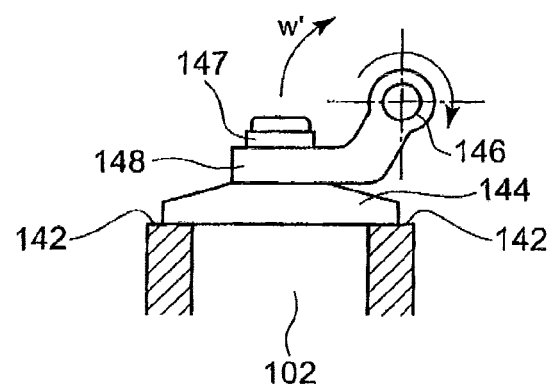
FIG. 12 is a fragmentary view taken in a direction of an arrow B of FIG. 11.

In the embodiment, a structure of a supply and exhaust device of the engine to which a wastegate valve of the present invention is applied substantially the same as the one shown in FIG. 9 and thus, the description regarding FIG. 9 may be applied to the embodiment to save further explanation.

Figure 1:
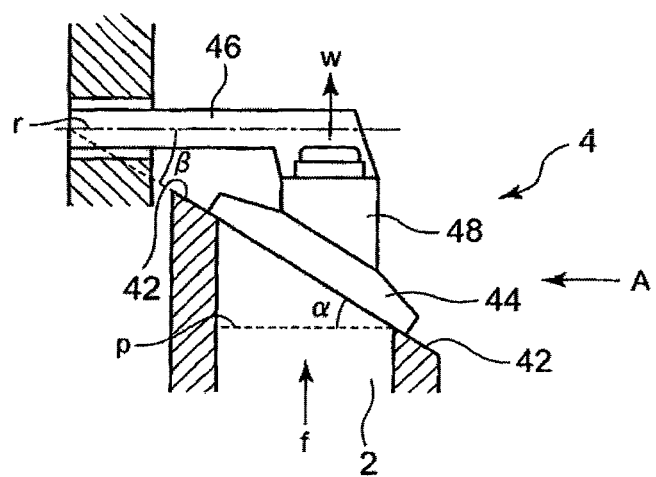
FIG. 1 is a side view of a wastegate valve of the present invention, with a local sectional view to show an inclination angle $\alpha$.
Figure 2:
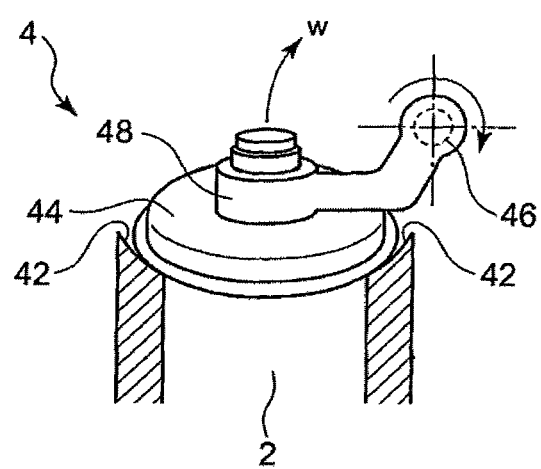
FIG. 2 is a fragmentary view taken in a direction of an arrow A of FIG. 1.

FIG. 1 is a side view of a wastegate valve of the present invention, with a local sectional view to show an inclination angle $\alpha$. FIG. 2 is a fragmentary view taken in a direction of an arrow A of FIG. 1.

The wastegate valve of the present embodiment is now explained in reference to FIG. 1 and FIG. 2.

The wastegate valve 4 opens when a valving element seats on a valve seat 42. The valve seat 42 is disposed at an end of a bypass path 2 and is formed by an open end of the bypass path 2 opening to the air exhaust path 60 (not shown in FIG. 1). The valving element 44 is supported by a pivot shaft 46 such that the valving element 44 is pivotable in a direction of an arrow W around a shaft center r of the pivot shaft 46 via a support arm 48.

The valve seat 42 forming the open end of the bypass path is formed in a plane which has an inclination angle α with respect to an assumed plane p which is perpendicular to a flow f of the exhaust gas in the bypass path 2.

The pivot shaft 46 supports the valving element 44 via the support arm 48. The pivot shaft 46 has a relationship of 0°<β<90° where β is an inclination angle between the shaft center r of the pivot shaft 46 and the plane where the valve seat 42 is formed. In the present embodiment, the shaft center r of the pivot shaft 46 is in a plane parallel to the assumed plane p and β=α as an example.

Accordingly, to open the valving element, the pivot shaft 46 is turned to pivot the valving element 44 in the direction of the arrow W via the support arm 48 so as to detach the valving element 44 from the valve seat 42.

In this manner, the valve seat 42 forming the open end of the bypass path is formed in the plane which has the inclination angle α with respect to the assumed plane p perpendicular to the flow f of the exhaust gas, i.e. the axial direction of the bypass path 2. Further, the valving element 44 is disposed such that the pivot center is angled with respect to the plane where the valve seat 42 is formed. Thus, a resolving power of the wastegate increases, i.e. the flow rate of the exhaust gas with respect to the stroke of the wastegate valve being obtained with higher precision. By this, the flow rate of the exhaust gas passing through the wastegate valve changes slowly in response to the opening of the valve. This is particularly evident in the region where the opening degree of wastegate valve is small.

Therefore, the flow rate of the exhaust gas passing through the bypass path 2 can be easily controlled by adjusting the opening degree of the wastegate valve, even in the region where the opening of the valve is small.

When there is clearance for or looseness due to assembling of the wastegate valve, even if the opening degree of the valve changes slightly due to the clearance or the looseness, the flow rate of the exhaust gas through the wastegate valve changes slowly in response to the opening of the valve. This causes little change in the flow rate of the exhaust gas through the wastegate valve, hence causing no issue.

Figure 3:
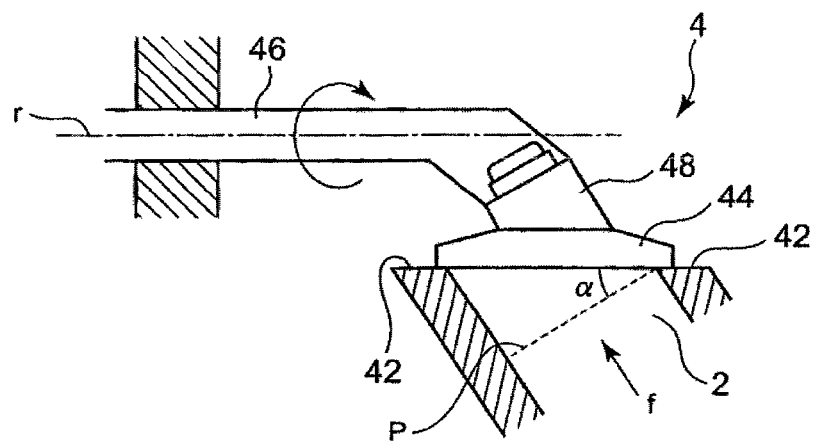
FIG. 3 is a side view of the wastegate valve in a modified example where an inclination angle $\beta$ of the wastegate valve of FIG. 1 is set approximately 0°.
Figure 4:
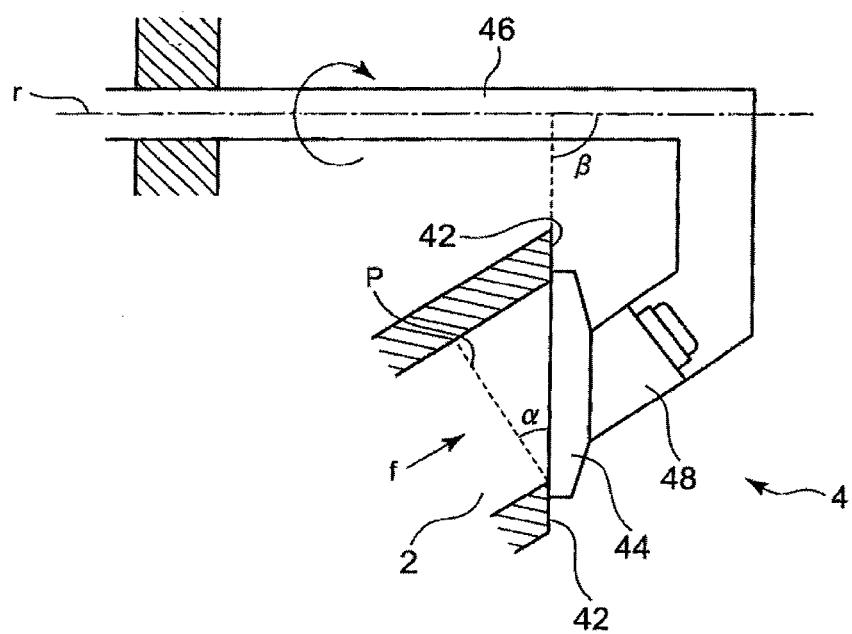
FIG. 4 is a side view of the wastegate valve in another modified example where the inclination angle $\beta$ of the wastegate valve of FIG. 1 is set approximately 90°.

FIG. 3 is a side view of the wastegate valve in a modified example where the inclination angle β of the wastegate valve of FIG. 1 is set approximately 0°. FIG. 4 is a side view of the wastegate valve in another modified example where the inclination angle β of the wastegate valve of FIG. 1 is set approximately 90°.

When the inclination angle β is set as 0°<β<90° as shown in FIG. 1, FIG. 3 and FIG. 4, the resolving power of the stroke of the wastegate valve is precise and the flow rate of the exhaust gas through the wastegate valve changes slowly in response to the valve opening.

Figure 5:
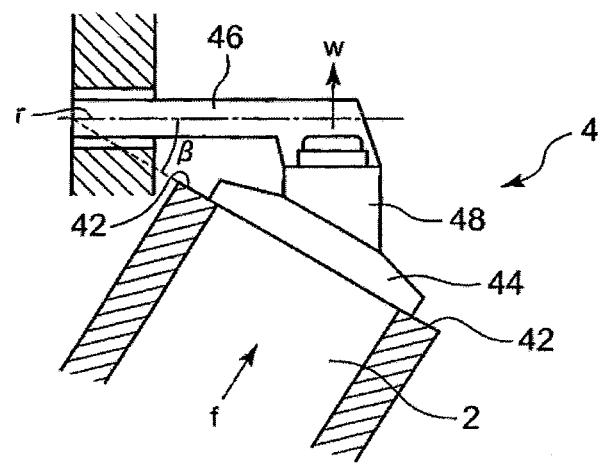
FIG. 5 is a side view of the wastegate valve in a modified example where the inclination angle $\alpha$ of the wastegate valve of FIG. 1 is set approximately 0°.
Figure 6:
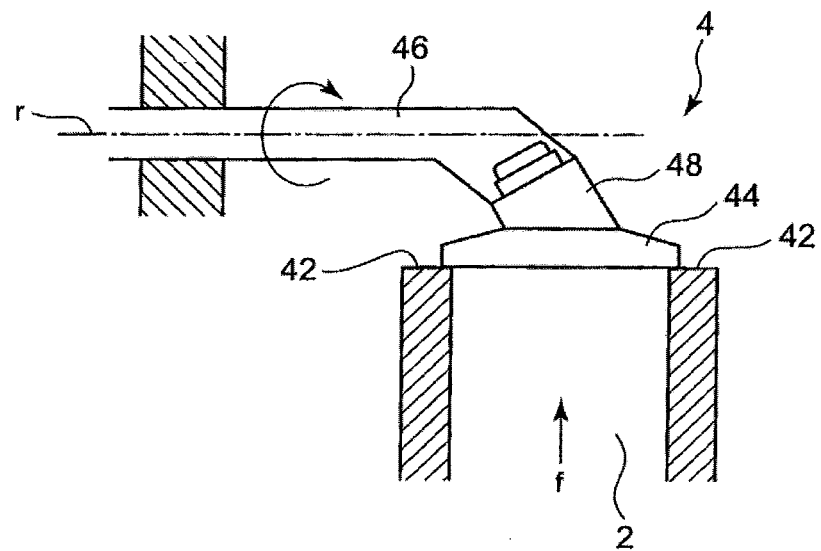
FIG. 6 is a side view of the wastegate valve in a modified example where the inclination angle $\beta$ of the wastegate valve of FIG. 5 is set approximately 0°.
Figure 7:
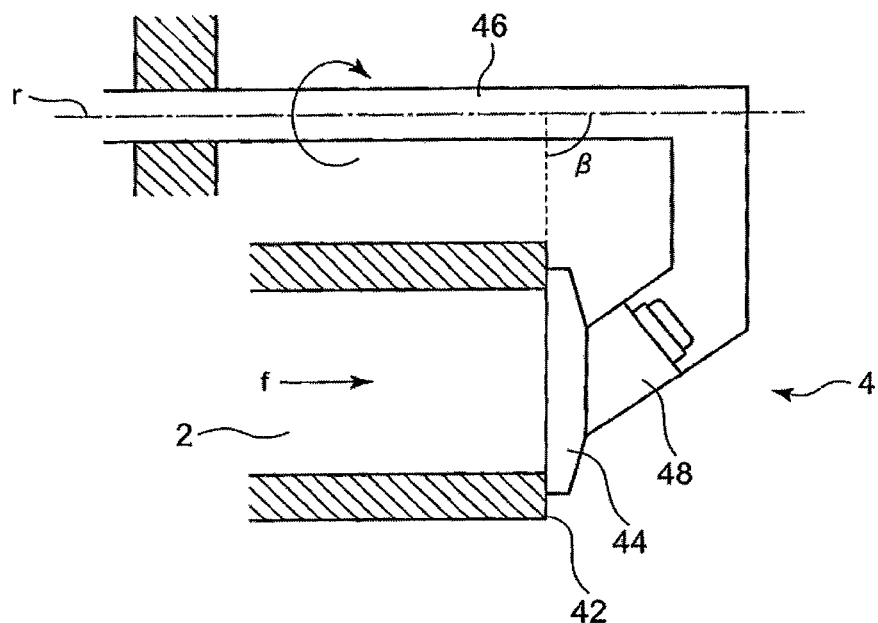
FIG. 7 is a side view of the wastegate valve in another modified example where the inclination angle $\beta$ of the wastegate valve of FIG. 5 is set approximately 90°.

FIG. 5 is a side view of the wastegate valve in a modified example where the inclination angle α of the wastegate valve of FIG. 1 is set approximately 0°, i.e. the valve seat being arranged in the plane perpendicular to the axial direction of the bypass path. FIG. 6 is a side view of the wastegate valve in a modified example where the inclination angle β of the wastegate valve of FIG. 5 is set approximately 0°. FIG. 7 is a side view of the wastegate valve in another modified example where the inclination angle β of the wastegate valve of FIG. 5 is set approximately 90°.

When the inclination angle α is set approximately 0°, i.e. the valve seat being arranged in the plane perpendicular to the axial direction of the bypass path and the inclination angle β is set in the range of 0° to 90°, the resolving power of the stroke of the wastegate valve is precise and thus, the flow rate of the exhaust gas through the wastegate valve changes slowly in response to the valve opening.

Figure 8:
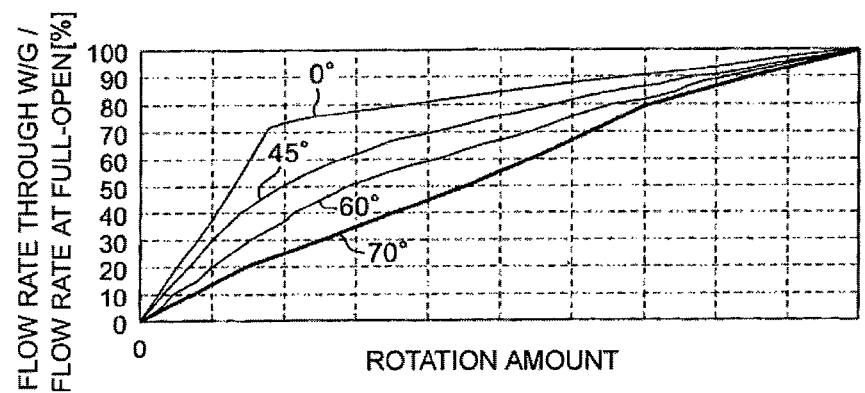
FIG. 8 is a graph showing a relationship between a rotation amount of the wastegate valve and a flow rate through the wastegate valve/a flow rate at full open [%] regarding the wastegate valve of the embodiment shown in FIG. 1.

FIG. 8 is a graph showing a relationship between a rotation amount of the wastegate valve and a flow rate through the wastegate valve/a flow rate at full open [%] regarding the wastegate valve of the embodiment shown in FIG. 1. In the graph, the vertical axis represents the flow rate through the waste gate valve/the flow rate in a full-open state, and the horizontal axis represents the rotation amount of the wastegate valve. The rotation amount herein means a rotation amount of the valving element 44 being rotated around a rotation center of the axial direction of the bypass path 2, i.e. the direction perpendicular to the flow f of the exhaust gas. The rotation amount corresponds to the valve opening.

FIG. 8 shows four lines on the graph. Each line on the graph represents the inclination angle α of FIG. 1 set at 0°, 45°, 60° or 70°. The line with the inclination angle α of 0° represents a case of the conventional wastegate valve.

As evident from FIG. 8, the greater the inclination angle α is, the slower the flow rate of the exhaust gas through the wastegate valve changes in response to the change in the opening degree of the wastegate valve. Therefore, with increased inclination angle α, the flow rate of the exhaust gas passing through the wastegate valve can be controlled in a stable manner by adjusting the opening degree of the wastegate valve.

At the inclination angle α below 45°, the effectiveness of stable control of the flow rate of the exhaust gas is small and thus, it is necessary to set a lower limit of the inclination angle α to 45°. To further improve the stable control of the flow rate of the exhaust gas, the lower limit of the inclination angle α is preferably set to 60°.

If the inclination angle α is too great, it is difficult to achieve enough sealing when the valve is closed. At the inclination angle α greater than 80°, the exhaust gas is likely to pass through the wastegate valve even in the closed state. Thus, it is necessary to set an upper limit of the inclination angle α to 80°, preferably to 70°.

At the inclination angle α of 45° to 80°, preferably 60° to 70°, it is possible to attain high sealing capability. Further by regulating the opening degree of the wastegate valve, it is possible to stably control the flow rate of the exhaust gas passing through the wastegate valve.

INDUSTRIAL APPLICABILITY

The wastegate valve which is provided in the bypass path to bypass the turbine of the turbocharger in the exhaust gas path and which opens and closes the bypass path, can be used to control the flow rate of the exhaust gas passing through the bypass path easily and stably by controlling the opening degree of the wastegate valve.

The invention claimed is:
1. A wastegate valve apparatus comprising:
 a bypass path which bypasses a turbine of a turbocharger in an exhaust gas path of an engine;
 a wastegate valve which is provided in the bypass path and which is configured to open and close the bypass path;
 a valve seat which is formed in a plane tilted with an inclination angle with respect to an axial direction of the bypass path;

a pivot shaft which has a pivot center line arranged in a relationship of 0°<β<90° where β is an inclination angle with respect to a direction of the plane including the valve seat in a side view showing the axial direction of the bypass path; and a valving element which is pivotable around the shaft center line of the pivot shaft via a support arm, the valving element being configured to be moved away from or closer to the valve seat by pivotation of the valving element to open or close the valve.

2. The wastegate valve apparatus according to claim 1, wherein the valve seat has an inclination angle α of 45° to 80° with respect to a plane which is perpendicular to the axial direction of the bypass path.

3. The wastegate valve apparatus according to claim 2, wherein the inclination angle α of the valve seat is 60° to 70°.

* * * * *